(12) United States Patent
Kim et al.

(10) Patent No.: US 10,152,069 B2
(45) Date of Patent: Dec. 11, 2018

(54) SYSTEM AND METHOD FOR CONTROLLING A VOLTAGE UNBALANCE IN A LOW-VOLTAGE DIRECT CURRENT DISTRIBUTION SYSTEM

(71) Applicant: RESEARCH & BUSINESS FOUNDATION SUNGKYUNKWAN UNIVERSITY, Suwon-si (KR)

(72) Inventors: Chul Hwan Kim, Seoul-si (KR); Gi Hyeon Gwon, Suwon-si (KR); Tack Hyun Jung, Uiwang-si (KR); Joon Han, Bucheon-si (KR); Yun Sik Oh, Suwon-si (KR); Doo Ung Kim, Suwon-si (KR); Chul Ho Noh, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 224 days.

(21) Appl. No.: 15/053,007

(22) Filed: Apr. 29, 2016

(65) Prior Publication Data

US 2016/0266592 A1    Sep. 15, 2016

(30) Foreign Application Priority Data

Mar. 13, 2015  (KR) .................. 10-2015-0034965

(51) Int. Cl.
G05D 3/12   (2006.01)
G05F 1/46   (2006.01)
G05B 15/02  (2006.01)

(52) U.S. Cl.
CPC ............... *G05F 1/46* (2013.01); *G05B 15/02* (2013.01)

(58) Field of Classification Search
CPC .................................. G05F 1/46; G05B 15/02
USPC ......................................................... 700/298
See application file for complete search history.

(56) References Cited

U.S. PATENT DOCUMENTS

2010/0085788 A1*  4/2010  Zacharias ............... H02M 7/48
                                                   363/123
2013/0286697 A1*  10/2013 Eiland ....................... H02J 3/26
                                                   363/71

* cited by examiner

*Primary Examiner* — Tha-O H Bui
(74) *Attorney, Agent, or Firm* — NSIP Law (57) ABSTRACT

A system for controlling voltage unbalance in a direct current distribution system includes a measurement processor configured to measure a positive load current, and a negative load current at a first load point, including a first load connected to a positive line and a neutral line and a second load connected to the neutral line and a negative line, and at a second load point in a power distribution system; and a control processor configured to determine whether to activate a first load point switching signal based on the positive and negative load currents at the first and second load points to control the first load point to switch the connections of the first load and the second load between the positive line and the negative line.

18 Claims, 4 Drawing Sheets

SYSTEM AND METHOD FOR CONTROLLING A VOLTAGE UNBALANCE IN A LOW-VOLTAGE DIRECT CURRENT DISTRIBUTION SYSTEM

CROSS-REFERENCE TO RELATED APPLICATION(S)

This application claims the benefit under 35 USC 119(a) of Korean Patent Application No. 10-2015-0034965 filed on Mar. 13, 2015 in the Korean Intellectual Property Office, the entire disclosure of which is incorporated herein by reference for all purposes.

BACKGROUND

Field

The following description relates to a control of a voltage imbalance in a direct current (DC) distribution system.

Description of Related Art

In traditional alternating current (AC) power distribution, digital devices having direct current (DC) loads are supplied power through a DC power adapter that converts the alternating current (AC) power. Also, battery-based power storage and photovoltaic generation use or provide DC power that must be converted to or from AC power for transmission or reception via the traditional AC distribution system.

Direct current (DC) distribution is suitable for digital devices, battery-based power storage devices, and photovoltaic generation devices because they operate using DC power. DC distribution has been applied to large-scale data centers with an abundance of DC loads, and to photovoltaic generation-based facilities that generate DC power.

DC distribution technology advantageously eliminates concerns related to AC distribution, such as reactive power, power factor, frequency, and electromagnetic radiation. Further, DC distribution technology also has the advantage of enabling DC power to be directly stored and used. Conversely, AC distribution technology needs to convert AC power into DC power for storing energy and to change the stored energy from DC power to AC power while taking into account frequency and phase for using the stored energy. Low-voltage direct current (DC) distribution systems are classified into unipolar systems and bipolar systems. A unipolar system supplies single common DC voltage via a positive line (+) and a negative line (−) to all loads. A bipolar system is a system where a load point is provided with two DC/DC converters. A first DC/DC converter uses the positive line (+) and the neutral line (NT) to supply a first DC voltage to a first load and a second DC/DC converter uses the neutral line (NT) and the negative line (−) to provide a second DC voltage to a second load. A bipolar system is more stable than a unipolar system because even when loads on one line, the positive line (+) or the negative line (−), suffer from a fault, such as a short circuit, loads on the other line, the negative line (−) or the positive line (+), are not influenced.

At each load point in a bipolar system, a first load current flows to the neutral line from a consumer load, which receives the first DC voltage between the positive line (+) and the neutral line (NT). In the same manner, a second load current flows to the neutral line (NT) from another consumer, which receives the second DC voltage between the neutral line (NT) and the negative line (−). If the loads of the first and second consumer at the load point are balanced, the first load current and the second load current are desirably balanced in the neutral line. This results in a minimal net current flow in the neutral line, which prevents a voltage drop from occurring due to the impedance of the neutral line. However, even if the loads connected to the positive line (+) and the negative line (−) are initially balanced, the magnitude of the loads will change over time causing an unbalanced current between the positive line (+) and the negative line (−). The unbalanced current leads to the neutral line receiving higher current and causes the voltage of the neutral line (NT) to shift due to the impedance of the neutral line (NT). The voltage shift of the neutral line (NT) creates a voltage unbalance between the positive line (+) and the negative line (−).

Therefore, there is a need for a technique capable of reducing the influence of load unbalance in DC distribution technology.

SUMMARY

In one general embodiment, a system for controlling voltage unbalance in a direct current distribution system includes a measurement processor configured to measure a positive load current, and a negative load current at a first load point, includes a first load connected to a positive line and a neutral line and a second load connected to the neutral line and a negative line, and at a second load point in a power distribution system; and a control processor configured to determine whether to activate a first load point switching signal based on the positive and negative load currents at the first and second load points to control the first load point to switch the connections of the first load and the second load between the positive line and the negative line.

The measurement processor may be further configured to measure a positive distribution voltage and a negative distribution voltage at the first and second load points.

The control processor may be further configured to determine whether to activate the first load point switching signal based on a determination that a calculated voltage unbalance factor (VUF) exceeds a predetermined value, the (VUF) based on the measured positive distribution voltage and negative distribution voltage.

The system may have N−2 load points, where the first load point is the (N−k)-th load point, second load point is the (N−1−k)-th load point, and the switching signal is a (N−k)-th load point switching signal, and the control processor may be configured to process the N−2 load points for every k, where 0≤k≤N−2.

The control processor of the system may activate the first load point switching signal upon a determination that a threshold value is exceeded by either the combined positive load current values of the first and second load points or the combined negative load current values of the first and second load points.

The control processor of the system may also activate the first load point switching signal upon a determination that a threshold value is exceeded by an absolute difference between an absolute sum of the positive load values, of the first and second load points, and an absolute sum of the negative load values, of the first and second load points.

The measurement processor may measure a positive load current and a negative load current at a third load point includes a third load connected to a positive line and a neutral line and a fourth load connected to the neutral line and a negative line, and a fourth load point in the power distribution system, and the control processor may activate another load point switching signal based on the positive and negative load currents at the third and fourth load points.

The system may further include a first switch configured to connect the first load to either the positive line or the negative line at the first load point in response to the switching signal; and a second switch configured to connect the second load to either the negative line or the positive line at the first load point in response to the first load point switching signal.

The system may further include a first and second buck converters configured to supply direct current (DC) voltages to the first and second loads.

In another general embodiment, a direct current (DC)/DC converter for a direct current distribution system, the DC/DC converter includes a first buck converter configured to supply a DC voltage to a first load at a first load point; a second buck converter configured to supply another DC voltage to a second load at the first load point; and a first switch configured to connect the first buck converter to either a positive line or a negative line at the first load point in response to a first load point switching signal; and a second switch configured to connect the second buck converter to either the negative line or the positive line at the first load point in response to the first load point switching signal, and the first and second switches are configured to switch the first and second buck converters from their connected load lines, positive or negative, to the opposite load line.

In another general embodiment, a system for controlling voltage unbalance in a direct current (DC) distribution system includes a measurement processor configured to measure a positive distribution voltage, a negative distribution voltage, a positive load current and a negative load current at a first load point and at a second load point; and a control processor configured to calculate a voltage unbalance factor (VUF) based on the measured positive distribution voltage and negative distribution voltage, and to activate a first load point switching signal capable of controlling a first load and a second load connected to a first load point upon a determination that the calculated VUF exceeds a predetermined value.

In one general aspect a method for controlling voltage unbalance in a direct current distribution system includes measuring a positive load current and a negative load current at a first load point, includes a first load connected to a positive line and a neutral line and a second load connected to the neutral line and a negative line, and at a second load point in a power distribution system; determining whether to activate a first load point switching signal based on relationship between positive load currents and negative load currents at the first and second load points; and upon a determination that first load point switching signal is activated, switching connections of the first and second loads between the positive line and the negative line.

The measuring may further include measuring a positive distribution voltage and a negative distribution voltage at the first and second load points, and the determination may further include determining whether to activate the first load point switching signal based on a determination that a calculated voltage unbalance factor (VUF) exceeds a predetermined value, the (VUF) based on the measured positive distribution voltage and negative distribution voltage.

Activating the first load point switching signal may include activating the first load point switching signal upon a determination that a threshold value is exceeded by either the combined positive load current values of the first and second load points or the combined negative load current values of the first and second load points.

Activating the first load point switching signal may include activating the first load point switching signal upon a determination that a threshold value is exceeded by an absolute difference between an absolute sum of the positive load values, of the first and second load points, and an absolute sum of the negative load values, of the first and second load points.

The method may further include measuring a positive load current and a negative load current at a third load point includes a third load connected to a positive line and a neutral line and a fourth load connected to the neutral line and a negative line, and a fourth load point in the power distribution system, and activating another load point switching signal based on the positive and negative load currents at the third and fourth load points.

The positive load current may be measured at the first load and the negative load current may be measured at the second load.

The method may further include upon a determination that the first load point switching signal is deactivated, the first load point maintains the connections of the first and second loads.

The first load point and the second load point of the method may be adjacent load points in the power distribution system.

In one general configuration, a method for controlling voltage unbalance in a direct current distribution system includes measuring a positive distribution voltage, a negative distribution voltage, a positive load current and a negative load current at a first load point and at a second load point; calculating a voltage unbalance factor (VUF) based on the measured positive distribution voltage and negative distribution voltage; and controlling a first load and a second load connected to the first load point to switch connections with one another, upon a determination that the calculated VUF exceeds a predetermined value.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

When an element is referred to as being "on," "connected to," "coupled to," or "adjacent to," another element, the element may be directly on, connected to, coupled to, or adjacent to, the other element, or one or more other intervening elements may be present.

Figure 1:
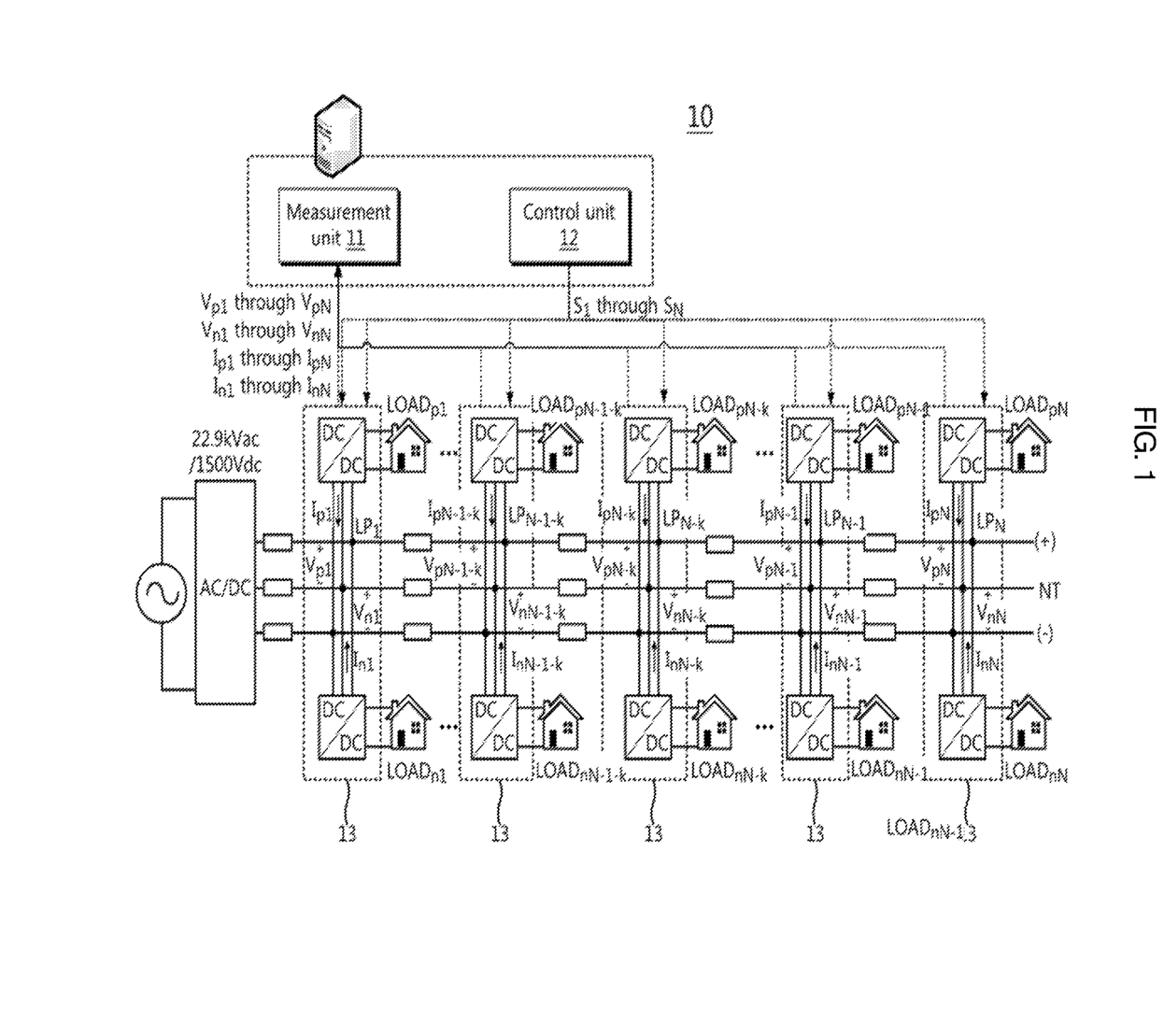
FIG. 1 is a conceptual diagram illustrating a system for controlling the voltage unbalance in a low-voltage direct current (DC) distribution system according to an embodiment.

FIG. 1 is a conceptual diagram illustrating a system 10 for controlling the voltage unbalance in a low-voltage direct current (DC) distribution system according to an embodiment.

Referring to FIG. 1, system 10 includes N load points $LP_1$ to $LP_N$. At each of the load points $LP_1$ to $LP_N$, a first load $LOAD_{p1}, \ldots,$ or $LOAD_{pN}$ is connected between a positive line (+) and a neutral line (NT) and a second load $LOAD_{n1}, \ldots,$ or $LOAD_{nN}$ is connected between the neutral line (NT) and a negative line (−).

For this configuration, the system 10 includes a measurement processor 11, a control processor 12, and N DC/DC converters 13.

The measurement processor 11 measures a positive distribution voltage $V_{p1}, \ldots,$ or $V_{pN}$, a negative distribution voltage $V_{n1}, \ldots,$ or $V_{nN}$, a positive load current $I_{p1}, \ldots,$ or $I_{pN}$, and a negative load current $I_{n1}, \ldots,$ or $I_{nN}$, at each of the load points $LP_1$ to $L_{PN}$.

According to one embodiment, the measurement processor 11 directly measures voltages and currents at each load point. The measurement processor 11 may also be provided with voltage and current values that are measured by the DC/DC converters 13 for their own operations.

The control processor 12 calculates a voltage unbalance factor (VUF) based on the measured positive distribution voltages $V_{p1}$ to $V_{pN}$ and negative distribution voltages $V_{n1}$ to $V_{nN}$, and may activate or deactivate a load point switching signal. The load point switching signal is configured to control the DC/DC converters 13 so that a first and second load, each connected at least one of the load points $LP_1$ to $LP_N$, are switched between the positive line (+) and the negative line (−) if the calculated VUF exceeds a preset value.

For example, the control processor 12 calculates the VUF based on the measured positive distribution voltages $V_{p1}$ to $V_{pN}$ and negative distribution voltages $V_{n1}$ to $V_{nN}$ and may activate or deactivate an (N−k)-th load point switching signal $S_{N-k}$ based on the relationship between positive load currents $I_{pN-1-k}$ and $I_{pN-k}$ and negative load currents $I_{nN-1kK}$ and $I_{nN-k}$ at a pair of neighboring load points, i.e., (N−1−k)-th and (N−k)-th load points $LP_{N-1-k}$ and $LP_{N-k}$, if the calculated VUF exceeds a preset value. The variable k is an integer that is 0≤k≤N−2. In one example, the initial value of k is 0, and is gradually increased by 1 after the activation or deactivation of the load point switching signal $S_{N-k}$ has been determined at each load point.

The (N−k)-th load point switching signal indicates, when activated, that the first and second loads $LOAD_{pN-k}$ and $LOAD_{nN-k}$ should switch their connections to the opposite power line. For example, the first load $LOAD_{pN-k}$, connected to the positive line (+) at the (N−k)-th load point $LP_{N-k}$, should switch its connection to the negative line (−) at the (N−k)-th load point $LP_{N-k}$. Similarly, the second load $LOAD_{nN-k}$, connected to the negative line (−) at the (N−k)-th load point $LP_{N-k}$, should switch its connection to the positive line (+) at the (N−k)-th load point $LP_{N-k}$. It should be appreciated that both the first load and the second load $LOAD_{pN-k}$ and $LOAD_{nN-k}$ are connected to the neutral line (NT) in either case, although the terminals connected thereto are switched.

When the (N−k)-th load point switching signal $S_{N-k}$ is deactivated, the prior connection states of the first and second loads $LOAD_{pN-k}$ and $LOAD_{nN-k}$ are maintained. The control processor 12 may recursively activate or deactivate a load point switching signal at each pair of neighboring load points.

For example, for two neighboring load points $LP_{head}$ and $LP_{tail}$, where tail load point $LP_{tail}$ is farther from the transmission system, the control processor 12 may activate or deactivate a load point switching signal $S_{tail}$ at a load point $LP_{tail}$ based on a first combined load current value $I_{head}$, comprising a positive load current and a negative load current, at the head load point $LP_{head}$ and a second combined load current value $I_{tail}$, comprising a positive load current and a negative load current, at the tail load point $LP_{tail}$. The activation or deactivation of the load point switching signal may be in accordance with Equation 1 below:

$$\begin{cases} S_{tail} = 1 \text{ if } |I_{head} + I_{tail}| - |I_{head} - I_{tail}| > \varepsilon \\ S_{tail} = 0 \text{ else} \end{cases} \quad (1)$$

Where $I_{head}$ is the first combined load current at the load point nearer to the transmission system, $I_{tail}$ is the second combined load current value at the load point farther from the transmission system, ε is a threshold value that may be set to, for example, about a few Ampere, and $S_{tail}$ is the binary value of a load point switching signal at the load point farther from the transmission system.

Accordingly, the control processor 12 may activate the (N−k)-th load point switching signal $S_{N-k}$ if a predetermined threshold values is exceeded by the difference between the absolute sum value and the absolute difference value of (N−1−k)-th combined load current value and (N−k)-th combined load current value obtained respectively by adding the positive load currents $I_{pN-1-k}$ and $I_{pN-k}$ and the negative load currents $I_{nN-1-k}$ and $I_{nN-k}$ at the neighboring (N−1−k)-th and (N−k)-th load points $LP_{N-1-k}$ and $LP_{N-k}$.

In another example, the control processor 12 may activate the (N−k)-th load point switching signal $S_{N-k}$ if a threshold value 62 is exceeded by at least one of the (N−1−k)-th and (N−k)-th combined load current values obtained respectively by adding the positive load currents $I_{pN-1-k}$ and $I_{pN-k}$ and the negative load currents $I_{nN-1-k}$ and $I_{nN-k}$ at the neighboring (N−1−k)-th and (N−k)-th load points $LP_{N-1-k}$ and $LP_{N-k}$.

In another example, the control processor 12 may activate the (N−k)-th load point switching signal $S_{N-k}$ if a predetermined threshold values is exceeded by the difference between the absolute sum of the positive current at a first and second neighboring load points, e.g. $I_{pN-k}$ and $I_{pN-1-k}$, and the absolute sum of the negative current at the first and second neighboring load points, e.g. $I_{nN-k}$ and $I_{nN-1-k}$.

When the (N−k)-th load point switching signal $S_{N-k}$ is deactivated at a specific k value, the control processor 12 maintains the connections of the first and second loads $LOAD_{pN-k}$ and $LOAD_{nN-k}$ to the positive line (+) and the negative line (−). The first and second loads $LOAD_{pN-k}$ and $LOAD_{nN-k}$ connected to the (N−k)-th load point $LP_{N-k}$.

When the (N−k)-th load point switching signal $S_{N-k}$ is activated at a specific k value by the control processor 12, the load point $LP_{N-k}$ performs switching in response to the activated (N−k)-th load point switching signal $S_{n-k}$. The load point $LP_{N-k}$ performs switching by switching the first load $LOAD_{pN-k}$, connected to the positive line (+) at the (N−k)-th load point $LP_{N-k}$, to the negative line (−) and switching the second load $LOAD_{nN-k}$, connected to the negative line (−), to the positive line (+).

The control processor 12 may repeat the above-described procedure, for each value of k between 0 and (N−1), activating or deactivating all pairs of neighboring load points.

Meanwhile, the N DC/DC converters 13 generate rated DC voltages from positive and negative distribution voltages applied from one and the other of the positive line (+) and negative line (−), and supply the generated rated DC voltages to the first and second loads $LOAD_{pN-k}$ and $LOAD_{nN-k}$ at the load point $LP_{N-k}$.

FIG. 1 is merely exemplary in nature and components can be added, removed, or rearranged without departing from the scope of the present disclosure. For example, the load lines depicted as a singular line may also be configured as a tree, a star, a grid, or any other connection network known to those of skill in the art. These configurations are possible for a direct current (DC) distribution system because, unlike an alternating current (AC) distribution system, there are no phases to align. This allows further redundancy that is not available in low-voltage AC distribution systems.

Figure 2:
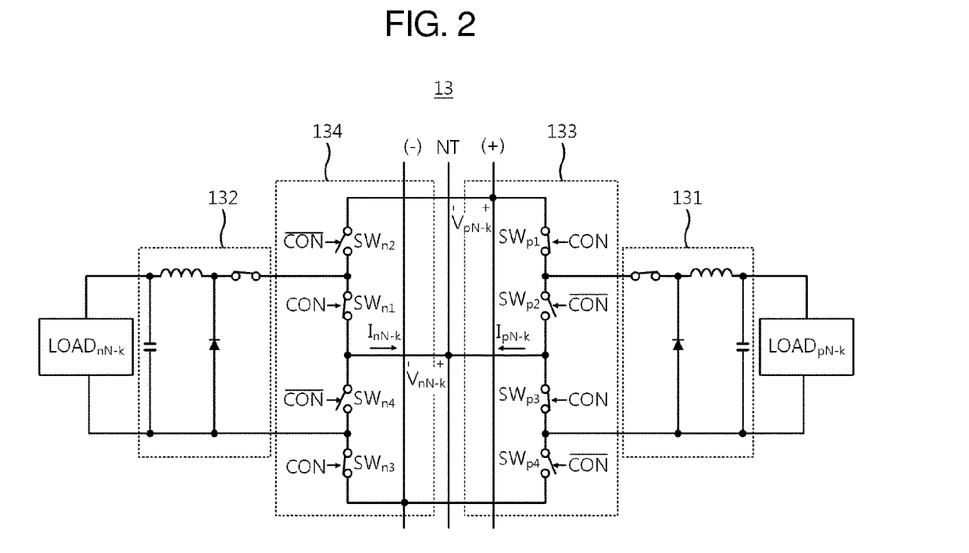
FIG. 2 is a conceptual diagram illustrating DC/DC converter coupling consumer loads to a direct current (DC) distribution system according to an embodiment.

FIG. 2 is a conceptual diagram illustrating a DC/DC converter coupling consumer loads to a low-voltage direct current (DC) distribution system according to an embodiment.

Referring to FIG. 2, the (N−k)-th load point $LP_{N-k}$, in one embodiment, includes a DC/DC converter 13, the first load $LOAD_{pN-k}$, and the second load $LOAD_{nN-k}$ connected to the positive line (+), the neutral line (NT), and the negative line (−).

The DC/DC converter 13 includes a first buck converter 131, a second buck converter 132, a first switching element 133, and a second switching element 134.

In FIG. 2, the first buck converter 131 is shown receiving a positive voltage $V_{pN-k}$ between the positive line (+) and the neutral line (NT) at load point $LP_{N-k}$, and supplies a rated DC voltage to the first load $LOAD_{pN-k}$.

Similarly, the second buck converter 132 receives a negative voltage $V_{nN-k}$ between the negative line (−) and the neutral line (NT) at load point $LP_{N-k}$, and supplies a rated DC voltage to the second load $LOAD_{nN-k}$.

The first and second buck converters 131 and 132 are DC/DC converters for outputting DC voltages lower than supplied DC voltages, and may be schematically represented using a switch, a diode, an inductor and a capacitor.

At load point $LP_{N-k}$, the first switching element 133 connects the positive line (+) to the first buck converter 131 and the second switching element 134 connects the negative line (−) to the second buck converter 132. In response to the next activated load point switching signal $S_{N-k}$, the first switching element 133 may connect the negative line (−) to the first buck converter 131 and the second switching element 134 may connect the positive line (+) to the second buck converter 132 at load point $LP_{N-k}$.

When the (N−k)-th load point switching signal $S_{N-k}$ is activated, the first and second switching elements 133 and 134 may operate to switch connections between the positive line (+) and the negative line (−); switching the first buck converter 131 from the positive line (+) to the negative line (−) and the second buck converters 132 from the positive line (+) to the negative line (−). The (N−k)-th load point switching signal $S_{n-k}$ may be received in response to the relationship between the positive load currents $Ip_{N-1-k}$ and $Ip_{N-k}$ and the negative load currents $I_{nN-1-k}$ and $I_{nN-k}$ measured at the (N−1−k)-th (where k is an integer that is 0≤k≤N−2) and (N−k)-th load points $LP_{N-1-k}$ and $LP_{N-k}$.

The first switching unit 133 includes first and third switches $SW_{p1}$ and $SW_{p3}$, between the positive line (+) and the neutral line (NT), configured to electrically connect the positive distribution voltage $V_{pN-k}$, and second and fourth switches $SW_{p2}$ and $SW_{p4}$, between the neutral line (NT) and the negative line (−), configured to electrically connect the negative distribution voltage $V_{nN-k}$ to the first buck converter 131. For example, the switch 133 performs the switching by opening $SW_{p1}$ and $SW_{p3}$ and closing $SW_{p2}$ and $SW_{p4}$.

Similarly, the second switching element 134 includes first and third switches $SW_{n1}$ and $SW_{n3}$, between the neutral line (NT) and the negative line (−), configured to electrically connect the negative distribution voltage $V_{nN-k}$ to the second buck converter 132, and second and fourth switches $SW_{n2}$ and $SW_{n4}$, between the positive line (+) and the neutral line (NT), configured to electrically connect the positive distribution voltage $V_{pN-k}$ to the second buck converter 132.

When the (N−k)-th load point switching signal $S_{N-k}$ is deactivated, the first and second switching elements 133 and 134 maintain the bit of a control signal CON to maintain the connection of the first and third switches $SW_{p1}$, $SW_{p3}$, $SW_{n1}$ and $SW_{n3}$ and the bit of an inverted control signal /CON to maintain the disconnection of the second and fourth switches $SW_{p2}$, $SW_{p4}$, $SW_{n2}$ and $SW_{n4}$.

In contrast, when the (N−k)-th load point switching signal $S_{N-k}$ is activated, the first and second switching elements 133 and 134 invert the bit of the control signal CON to control the first and third switches $SW_{p1}$, $SW_{p3}$, $SW_{n1}$, and $SW_{n3}$ to disconnect and the bit of the inverted control signal /CON to control the second and fourth switches $SW_{p2}$, $SW_{p4}$, $SW_{n2}$, and $SW_{n4}$ to connect.

Accordingly, in response to the activation of the (N−k)-th load point switching signal $S_{N-k}$, the first load $LOAD_{pN-k}$ may switch from the positive line (+) to the negative line (−) and simultaneously the second load $LOAD_{nN-k}$ may switch from the negative line (−) to the positive line (+).

According another embodiment, at each load point, the DC/DC converter 13 may independently switch loads between the positive line (+) and the negative line (−). A neighboring load point may further independently exchange loads between the positive line (+) and the negative line (−). The DC/DC converter 13 may further calculate a VUF based on the positive distribution voltage and the negative distribution voltage and report the VUF to the measurement processor; shown in FIG. 1. The DC/DC converter 13 may receive an activation or deactivation switching signal $S_N$ based on the relationship between positive load currents and negative load currents at neighboring load points.

FIG. 2 is merely exemplary in nature and components can be added, removed, or rearranged without departing from the scope of the present disclosure. For example, a load point may feature only a single load connected to the positive or negative lines (+) or (−). Alternatively, the first and second loads $LOAD_{pN-k}$ and $LOAD_{nN-k}$, may be switched independently. Additionally, the buck converters 131 and 132 may be directly connected to the positive line (+) and the negative line (−) and thereby feed power to the first and second switches 133 and 134 that may be directly connected to the first and second loads $LOAD_{pN-k}$ and $LOAD_{nN-k}$. Furthermore, the load point may be configured to have a plurality of loads connected to the positive line (+) and a plurality of loads connected to the negative line (−); where the loads may each be independently switched between the lines.

Figure 3:
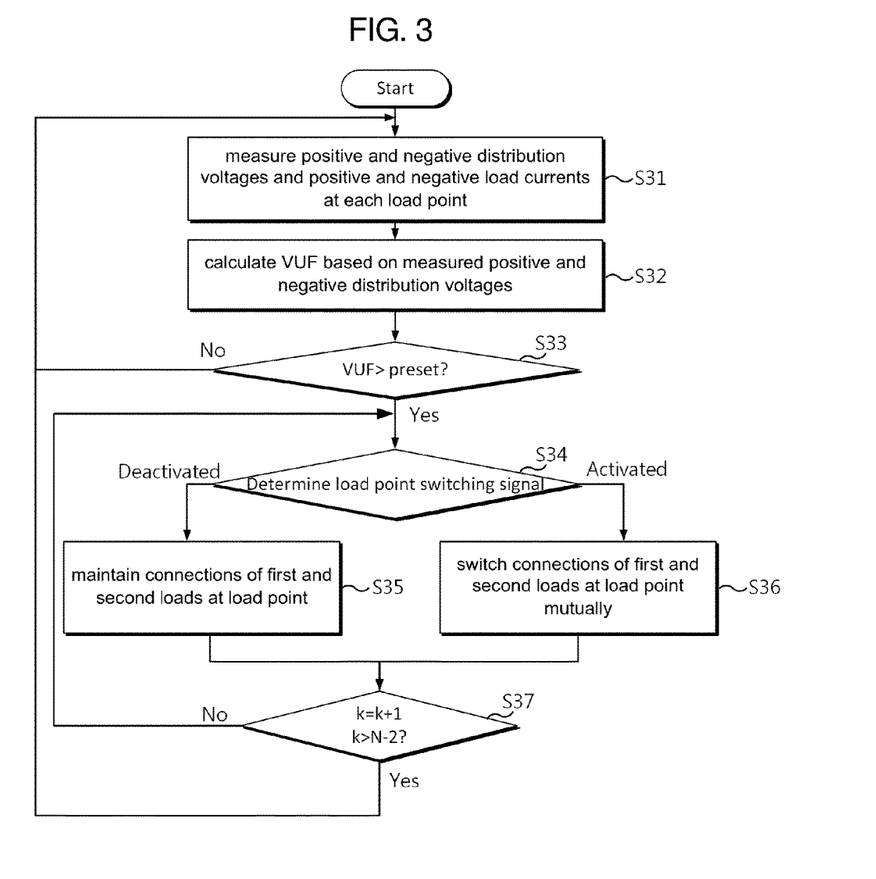
FIG. 3 is a flowchart illustrating a method for controlling the voltage unbalance in a direct current (DC) distribution system according to an embodiment.

FIG. 3 is a flowchart illustrating a method for controlling the voltage unbalance in a low-voltage direct current (DC) distribution system according to an embodiment.

Referring to FIG. 3, the method for a low-voltage direct current (DC) distribution system includes N load points which include a first load connected between a positive line (+) and a neutral line (NT) and a second load is connected between the neutral line (NT) and a negative line (−).

At step S31, a positive distribution voltage, a negative distribution voltage, a positive load current, and a negative load current at each load point are measured. The measurement may be performed directly by the measurement processor 11, shown in FIG. 1, or may be performed by the DC/DC converters 13, shown in FIG. 1.

At step S32, a VUF may be calculated based on the measured positive distribution voltage and negative distribution voltage.

At step S33, it is determined whether the calculated VUF exceeds a preset value, and proceeds to step S34 if the calculated VUF exceeds the preset value, or to step S31 if the calculated VUF does not exceed the preset value.

At step S34, at the (N−1−k)-th and (N−k)-th (where k is an integer that is 0≤k≤N−2) load points, activation or deactivation of the (N−k)-th load point switching signal may be determined based on the relationship between the positive load currents and the negative load currents.

According to an embodiment of the present discl, at step S34, the step of activating the (N−k)-th load point switching signal may include the step of activating the (N−k)-th load point switching signal if a threshold value is exceeded by either of the combined load current values. Where the combined load current values are obtained by adding the positive load currents and the negative load currents at the (N−1−k)-th and (N−k)-th load points.

According to an embodiment, at step S34, the step of activating the (N−k)-th load point switching signal may include the step of activating the (N−k)-th load point switching signal if a threshold value is exceeded by the difference between the absolute sum value and the absolute difference value of (N−1−k)-th combined load current value and (N−k)-th combined load current value obtained respectively by adding the positive load currents and the negative load currents at the neighboring (N−1−k)-th and (N−k)-th load points.

According to an embodiment, at step S34, the step of activating the (N−k)-th load point switching signal may include the step of activating the (N−k)-th load point switching signal if a threshold value is exceeded by the difference between the absolute sum of the positive current at a first and second neighbor load points, e.g. $I_{pN-k}$ and $I_{pN-1-k}$, and the absolute sum of the negative current at the first and second neighbor load points, e.g. $I_{nN-k}$ and $I_{nN-1-k}$.

When the (N−k)-th load point switching signal is deactivated, at step S34, the process proceeds to step S35, where the connections of the first and second loads at the (N−k)-th load point may be maintained.

When the (N−k)-th load point switching signal is activated, at step S34, the process proceeds to step S36, where the first and second loads $LOAD_{pN-k}$ $LOAD_{nN-k}$ at the (N−k)-th load point may switch connections such that the first load $LOAD_{pN-k}$, when connected to the positive line (+), is switched to the negative line (−) and the second load $LOAD_{nN-k}$, when connected to the negative line (−), is switched to the positive line (+).

After the connections of the first and second loads to the (N−k)-th load point have been maintained or switched, at step S35 or S36, k is increased by 1 at step S37. If k increased by 1 is equal to or smaller than (N−2), the process proceeds to step S34, and steps S34 and S35 or steps S34 and S36 are repeated.

According to an embodiment, k is increased by 1 at step S37. If k increased by 1 is equal to or smaller than N−2, at step S37, the process may proceed to step S33.

If k increased by 1 exceeds N−2, at step S37, the process proceeds to step S31, where all the steps may be repeated.

As illustrated in FIG. 2, when a calculated VUF exceeds a predetermined value, first and second loads connected to at least one load point are controlled to be switched between the positive line (+) and the negative line (−).

FIG. 3 is merely exemplary in nature and components can be added, removed, or rearranged without departing from the scope of the present disclosure. For example, as noted above, only a single load may be switched or, in the instance that more than one load is attached to the positive line (+) and the negative line (−) more than two loads may be switched.

Figure 4:
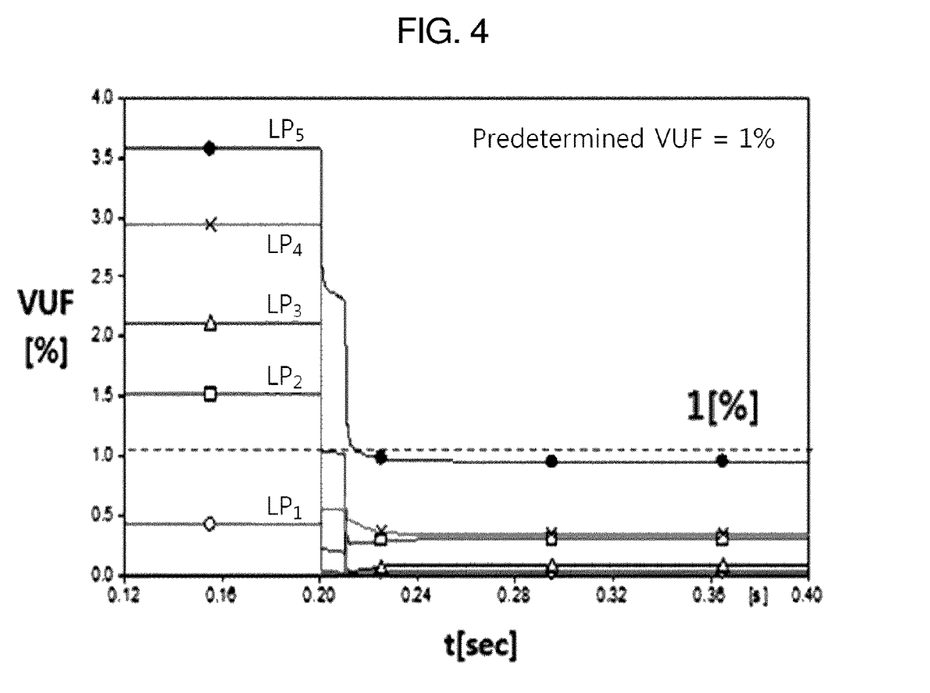
FIG. 4 is a graph showing a voltage unbalance factor (VUF) while an embodiment of the technique for controlling the voltage unbalance in a direct current distribution system is in use according to an embodiment.

FIG. 4 is a graph showing a voltage unbalance factor (VUF) while an embodiment of the system and method for controlling the voltage unbalance in a direct current (DC) distribution system is in use according to an embodiment.

Referring to FIG. 4, a low-voltage direct current (DC) distribution system converts a DC distribution voltage of 1500 V into a rated DC voltage of 380 V and supplies the rated DC voltage to a customer. Five load points, $LP_1$, $LP_2$, ..., $LP_5$, are shown with a beginning load unbalance factor of 20%. The distance between loads is 100 m, the line impedance is 0.0182Ω/100 m, the neutral line impedance is 0.0301Ω/100 m and the preset value of a VUF is 1%. The plots illustrate operation of an example of the system and method by leaving voltage unbalance uncontrolled until t=0.20 seconds and applying an example of the system and method after t=0.20 seconds.

Before t=0.20 seconds, the VUF values of some farther load points in a transmission and distribution system exceed a preset value.

From t=0.20 seconds, the mutual switching operation of loads starts from the two load points farthest from a transmission and distribution system. Finally, the mutual switching operation of loads is repeated until the VUF values measured at all load points become equal or smaller than a preset value.

It can be seen that VUF values are decreased to a preset value or less near t=0.22 seconds soon after improving a VUF.

The neutral line power loss, in this example, decreases to about 182 W compared to 792 W before improving the VUF.

In accordance with one embodiment of a system and method for controlling the voltage unbalance in a low-voltage direct current (DC) distribution system, the construction of distribution power equipment or energy storage equipment is reduced.

In accordance with another embodiment of a system and method for controlling the voltage unbalance in a low-voltage direct current (DC) distribution system, existing equipment may be used in order to practice the disclosed techniques without the addition of switches.

In accordance with another embodiment of a system and method for controlling the voltage unbalance in a low-voltage direct current (DC) distribution system, there is no influence when a distribution system is expanded or the situation of a consumer is changed.

The units, controllers, and switches, and other components illustrated in FIG. 1 that perform the operations described herein with respect to FIGS. 1-3 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIG. 3. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 and 3 that perform the operations described herein with respect to FIGS. 1 and 3 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A system for controlling voltage unbalance in a direct current (DC) distribution system, the system comprising: a measurement processor configured to measure a positive load current and a negative load current at a first load point, comprising a first load connected to a positive line and a neutral line and a second load connected to the neutral line and a negative line, and at a second load point; and a control processor configured to determine whether to activate a first load point switching signal based on the positive and negative load currents at the first and second load points to control the first load point to switch the connections of the first load and the second load between the positive line and the negative line.

2. The system of claim 1, wherein the measurement processor is further configured to measure a positive distribution voltage and a negative distribution voltage at the first and second load points.

3. The system of claim 2, wherein the control processor is further configured to determine whether to activate the first load point switching signal based on a determination that a calculated voltage unbalance factor (VUF) exceeds a predetermined value, the (VUF) based on the measured positive distribution voltage and negative distribution voltage.

4. The system of claim 1, wherein the system comprises N−2 load points, where the first load point is the (N−k)-th load point, second load point is the (N−1−k)-th load point, and the switching signal is a (N−k)-th load point switching signal, and wherein the control processor is further configured to process the N−2 load points for every k, where $0 \leq k \leq N-2$.

5. The system of claim 1, wherein the control processor activates the first load point switching signal upon a determination that a threshold value is exceeded by either the combined positive load current values of the first and second load points or the combined negative load current values of the first and second load points.

6. The system of claim 1, wherein the control processor activates the first load point switching signal upon a determination that a threshold value is exceeded by an absolute difference between an absolute sum of the positive load values, of the first and second load points, and an absolute sum of the negative load values, of the first and second load points.

7. The system of claim 1, wherein the measurement processor is further configured to, measure a positive load current and a negative load current at a third load point, comprising a third load connected to a positive line and a neutral line and a fourth load connected to the neutral line and a negative line, and a fourth load point, and wherein the control processor is further configured to, activate another load point switching signal based on the positive and negative load currents at the third and fourth load points.

8. The system of claim 1, further comprising: a first switch configured to connect the first load to either the positive line or the negative line at the first load point in response to the switching signal; and a second switch configured to connect the second load to either the negative line or the positive line at the first load point in response to the first load point switching signal.

9. The system of claim 8, further comprising: a first and second buck converters configured to supply direct current (DC) voltages to the first and second loads.

10. A method for controlling voltage unbalance in a direct current (DC) distribution system, the method comprising: measuring a positive load current and a negative load current at a first load point, comprising a first load connected to a positive line and a neutral line and a second load connected to the neutral line and a negative line, and at a second load point; determining whether to activate a first load point switching signal based on relationship between positive load currents and negative load currents at the first and second load points; and upon a determination that first load point switching signal is activated, switching connections of the first and second loads between the positive line and the negative line.

11. The method of claim 10, wherein the measuring further comprises measuring a positive distribution voltage and a negative distribution voltage at the first and second load points, and wherein the determination further comprises determining whether to activate the first load point switching signal based on a determination that a calculated voltage unbalance factor (VUF) exceeds a predetermined value, the (VUF) based on the measured positive distribution voltage and negative distribution voltage.

12. The method of claim 10, wherein activating the first load point switching signal comprises activating the first load point switching signal upon a determination that a threshold value is exceeded by either the combined positive load current values of the first and second load points or the combined negative load current values of the first and second load points.

13. The method of claim 10, wherein activating the first load point switching signal comprises activating the first load point switching signal upon a determination that a threshold value is exceeded by an absolute difference between an absolute sum of the positive load values, of the first and second load points, and an absolute sum of the negative load values, of the first and second load points.

14. The method of claim 10, further comprising, measuring a positive load current and a negative load current at a third load point, comprising a third load connected to a positive line and a neutral line and a fourth load connected to the neutral line and a negative line, and a fourth load point, and activating another load point switching signal based on the positive and negative load currents at the third and fourth load points.

15. The method of claim 10, wherein the positive load current is measured at the first load and the negative load current at the second load.

16. The method of claim 10, further comprising, upon a determination that the first load point switching signal is deactivated, the first load point maintains the connections of the first and second loads.

17. The method of claim 10, wherein the first load point and the second load point are neighbor load points in the power distribution system.

18. A method for controlling voltage unbalance in a direct current (DC) distribution system, the method comprising: measuring a positive distribution voltage, a negative distribution voltage, a positive load current and a negative load current at a first load point and at a second load point; calculating a voltage unbalance factor (VUF) based on the measured positive distribution voltage and negative distribution voltage; and controlling a first load and a second load connected to the first load point to switch connections with one another, upon a determination that the calculated VUF exceeds a predetermined value.

* * * * *